(No Model.)
W. CALVER.
METHOD OF AND MEANS FOR CONTROLLING THE TEMPERATURE OF SOLAR HEATERS.
No. 291,147. Patented Jan. 1, 1884.
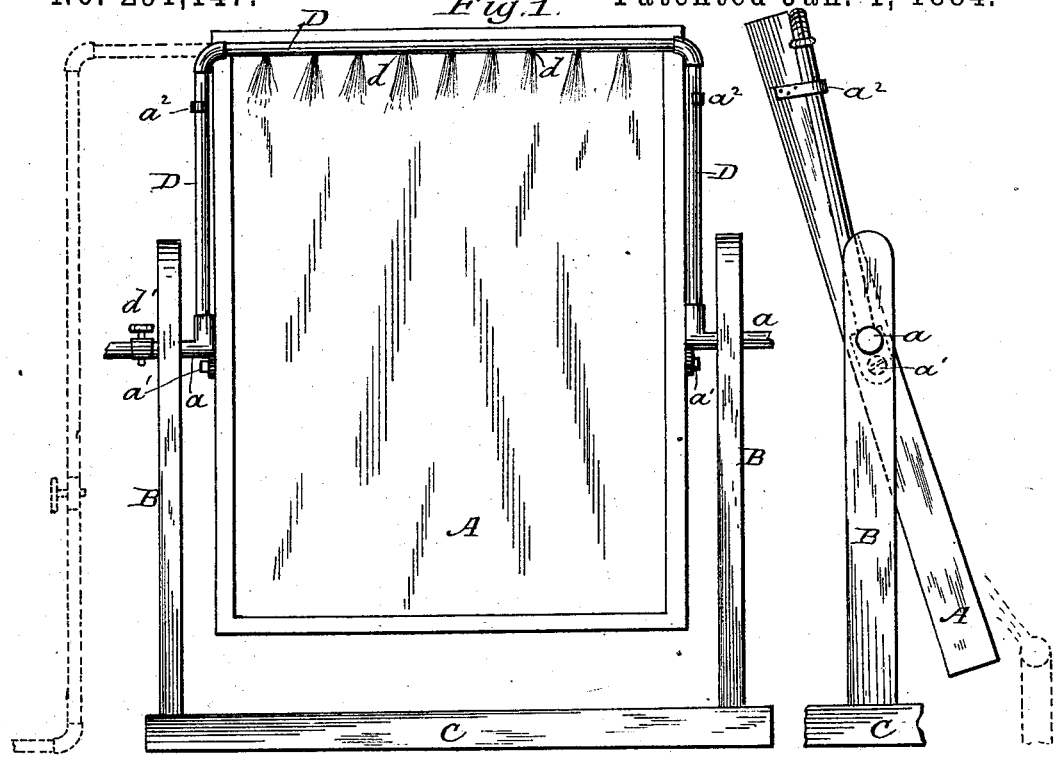
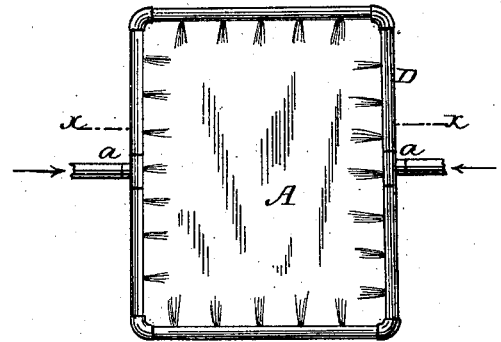
Witnesses:
L. C. Hills
E. E. Masson
Inventor:
William Calver
By E. B. Stocking
Atty.

UNITED STATES PATENT OFFICE.

WILLIAM CALVER, OF WASHINGTON, DISTRICT OF COLUMBIA.

METHOD OF AND MEANS FOR CONTROLLING THE TEMPERATURE OF SOLAR HEATERS.

SPECIFICATION forming part of Letters Patent No. 291,147, dated January 1, 1884.

Application filed April 25, 1883. (No model.)

*To all whom it may concern:*

Be it known that I, WILLIAM CALVER, a citizen of the United States, residing at Washington, District of Columbia, have invented certain new and useful Methods of and Means for Controlling the Temperature of Solar Reflectors, of which the following is a specification, reference being had therein to the accompanying drawings.

In the art of utilizing the solar rays the reflectors employed are liable, when subjected to excessive heat, to become injured, and when even of polished metal may be fused or melted, and attending this liability to injury is a greater or less loss of heat by reason of the amount absorbed by the reflector.

The objects of this invention are to devise a method whereby any reflector may be rendered practically incapable of absorbing heat from solar rays falling thereon, and means for applying said method to practicable uses under varying circumstances. The principle upon which my method is based is the interposition between a reflecting-surface and the solar rays falling thereon of a refrigerative substance in such a manner and in such a form as to cool the reflecting-surface, and yet offer no material obstruction to the passage of the rays to and from the said surface. One manner of applying this principle is to direct a selected refrigerant against the reflecting-surface, and in some instances more advantageous results may be attained by a like application of the refrigerant against the reflector at other points than its reflecting-surface, in which case, although not interposed between the solar rays and the reflecting-surface directly, the effect of the refrigerant is conveyed by the substance of the reflector to such relative intermediate position, and I therefore deem the latter disposition of a refrigerant the equivalent of the former. The form or condition in which the refrigerative substance is applied, as above described, is susceptible of variation, the only requisite being that it shall not materially interfere with or obstruct the action of the reflector upon the rays. If in a liquid or gaseous form, or if simply atmospheric air, the refrigerative substance may be directed, in a sheet, stream, jet, or spray, or other condition, against the reflector or its reflecting-surface, so as to pass over, cover, or flood it to any extent or depth which shall not materially obstruct the action of the surface upon the rays. Therefore, without regard to the material, conformation, or accessories of a reflector, or the means used in connection with it to apply my method to actual and practical use, said method consists in controlling the temperature of and practically preventing the absorption of heat-rays by a reflector by directing upon the same a sheet, jet, stream, or spray of a refrigerative substance.

My invention also consists in certain means for the practice of my method, as hereinafter described, and specifically set forth in the claims.

Figure 1 is a front and an end elevation of a reflector and means for directing a refrigerative substance thereon. Fig. 2 is a like view of a modified construction of a reflector and said means. Fig. 3 is a transverse section on the line $x\ x$ of Fig. 2.

Like letters refer to like parts in all the figures.

A represents a reflector, mounted on trunnions $a$ in upright standards B, secured to a base, C. The reflector may be of glass, metal, or of any suitable material, and in conformation plane, concave, convex, or of any other desired outline in cross-section. In this instance the trunnions are hollow, and formed of a pipe, D, which serves as the means for conducting water, gas, or air, or any other selected refrigerative substance, to such a position that when delivered therefrom through holes or slots $d\ d$ it falls upon, covers, and flows over the reflector, and prevents it from becoming injured by the excessive heat of solar rays falling or directed thereon. In fact, the refrigerative substance itself may become the reflecting-surface in part, and this I consider particularly advantageous by reason of the excessive heat accumulated by the method and means for which a patent was granted me July 4, 1882. By means of the screws $a'$ and clamps $a^2$, the pipe D is secured to the reflector, or, as shown in Figs. 2 and 3, said pipe may constitute the frame of the reflector, and slits or slots $d$ may be formed on all sides and at the back and front, if desired, so that both sides of the reflector may be simultaneously flooded. As shown at E and F and in dotted lines in Fig. 1, the refrigerant supplying and directing pipe or pipes may be located and supported aside of or independently of the reflector, so that the construction necessitated to adapt the pipe and reflector to be jointly tilted may be obviated. A controlling-valve, $d'$, is provided, by which the flow or supply of water or other refrigerative substance is regulated.

It is apparent that my method and any means for practicing it may be employed in connection with refractors and other devices used in the art of utilizing solar rays, and I therefore do not limit myself to the use of the same with reflectors, nor to any particular means for practicing said method.

I do not herein claim means for confining a current of refrigerative substance in contact with a reflector or refractor, as that is embraced in a companion application (Serial No. 92,865) pending herewith.

Having described my invention and its operation, what I claim is—

1. The method herein set forth of controlling the temperature of a solar reflector, which consists in directing upon an outer surface of the same a sheet, jet, or spray of water or other refrigerative substance.

2. A reflector in combination with means, substantially as specified, for directing upon an outer surface of the reflector a refrigerative substance, for the purpose set forth.

3. The combination of a reflector and a slitted or perforated pipe arranged to direct a refrigerant upon the reflector, substantially as shown and described.

4. The combination of a reflector and a slotted or perforated pipe having lateral arms forming trunnions, substantially as specified.

5. The combination of the reflector A and the pipe D, constituting a frame thereof, and slitted at $d\ d$, substantially as shown and described.

6. The combination of a reflector or a refractor and means for cooling its reflecting or refracting surface or medium, substantially as and for the purpose set forth.

In testimony whereof I affix my signature in presence of two witnesses.

WILLIAM CALVER.

Witnesses:
  E. B. STOCKING,
  M. P. CALLAN.